Patented Sept. 14, 1948

2,449,322

UNITED STATES PATENT OFFICE 2,449,322

COMPOUND FOR FISHING BAIT

Isaac F. Richardson, Gallatin, Tenn.

No Drawing. Application March 27, 1947,
Serial No. 737,729

4 Claims. (Cl. 99—3)

This invention relates to fishing bait, and more particularly to a mixture or compound for use as a fishing bait, designed to be painted or applied in the form of dough balls coated or painted with the compound, on hooks, plugs, flies, cut bait or other artificial bait, so that when the same is in the water, a small streamer of the compound, appearing as oil, exudes therefrom in case the water is flowing, but if the water is still, beads loose themselves from the compound and float to the surface where they break in the form of bubbles and form a smear on the surface of water to attract the fish, which when coming in contact with the beads or the smear or streamer, follow it rapidly to the source which may be the hook or bait, to strike the hook and thereby permit the catching of any kind of fish, including game fish, with remarkable success.

The compound for use as a bait for fishing consists of the following ingredients in substantially the proportions stated:

Oil of anise $\frac{1}{36}$ part of the whole
Pine tar $\frac{1}{36}$ part of the whole
Methyl salicylate $\frac{2}{36}$ parts of the whole
Mineral oil $\frac{16}{36}$ parts of the whole
Motor oil, preferably used, $\frac{16}{36}$ parts of the whole The ingredients are mixed as follows:

Pour the mineral oil and motor oil together and mix well. Then add pine tar and methyl salicylate. Mix this combination well and then add oil of anise. Again mix well and pour into closed containers.

The directions for use are as follows:

Dip the hook or bait into the compound or paint the compound on the hook or bait with a small brush. The compound may be used on any kind of plug, fly, artificial bait or cut bait. It may also be mixed with dough balls by mixing a small amount of the compound with the water to be used in mixing the dough or the dough balls may be prepared by using 2½ cups of ordinary flour mixed with just enough water to make a very thick paste similar to biscuit dough. Two ounces of the compound are then mixed with the flour and water, and rolled into balls of approximately one-half inch in diameter or smaller, so that the amount of dough produced will make approximately one hundred balls or more. This is allowed to set four days before using, when the balls may be placed upon the hook or bait, painting the same with the compound just before placing the same on the hooks, using a small brush.

When the compound is used directly on the hook, plug or bait, it will last for a period of twenty-four hours, during which time when in the water, and the water is flowing, a small streamer of oil exudes therefrom. The fish will strike at the oil, follow it to the hook and strike the hook. This bait attracts much attention and will catch any kind of fish, including game fish. The compound is black and about the thickness of mineral oil with adhering properties. It is well integrated and it is never necessary to stir or to shake it to keep the ingredients mixed, thus producing a stable compound which maintains its characteristics indefinitely. When placed in the water on a hook or other bait, if the water is flowing, the streamer of oil exudes therefrom, but if the water is still, beads or bubbles loose themselves from the compound and float to the surface where they break and form a smear on the surface of the water. The fish, when coming in contact with these beads or the smear, follow it rapidly to the source, namely, the hook or bait, and remarkable catches are thereby insured as has been determined by actual test and use.

Therefore, a desirable compound has been produced for use as a bait for fishing, when applied directly to the hook or bait, to attract fish, or when mixed with the dough for use as dough balls, to give the results claimed, and to produce a bait which results in remarkable catches.

While I have described the invention in its specific forms, it is to be understood that the proportions of the ingredients and manner of preparing the same may be modified as desired by the invention as claimed.

I claim:

1. A compound for fishing bait consisting of oil of anise, pine tar, methyl salicylate, mineral oil and motor oil.

2. A compound for fishing bait consisting of one part oil of anise, one part of pine tar, two parts of methyl salicylate, sixteen parts of mineral oil and sixteen parts of motor oil.

3. A doughball for fishing bait consisting of oil of anise, pine tar oil, methyl salicylate, flour and water, mineral oil and motor oil.

4. A doughball for fishing bait consisting of two ounces of a mixture of one part oil of anise, one part pine tar, two parts methyl salicylate, thirty-two parts of petroleum oils and two and one-half cups of a thick flour paste.

ISAAC F. RICHARDSON.

(References on following page)

REFERENCES CITED

The following references are of record in the file of this patent:

UNITED STATES PATENTS

| Number | Name | Date |
|---|---|---|
| 973,549 | O'Bryant | Oct. 25, 1910 |
| 1,006,841 | Freyer | Oct. 24, 1911 |
| 1,291,614 | Noxon | Jan. 14, 1919 |
| 1,366,509 | Thiessen | Jan. 25, 1921 |
| 1,608,688 | Williamson | Nov. 30, 1926 |

OTHER REFERENCES

"Baits," Pub. by Bureau of Fisheries, Dept. of Commerce, 1935, page 4.